UNITED STATES PATENT OFFICE.

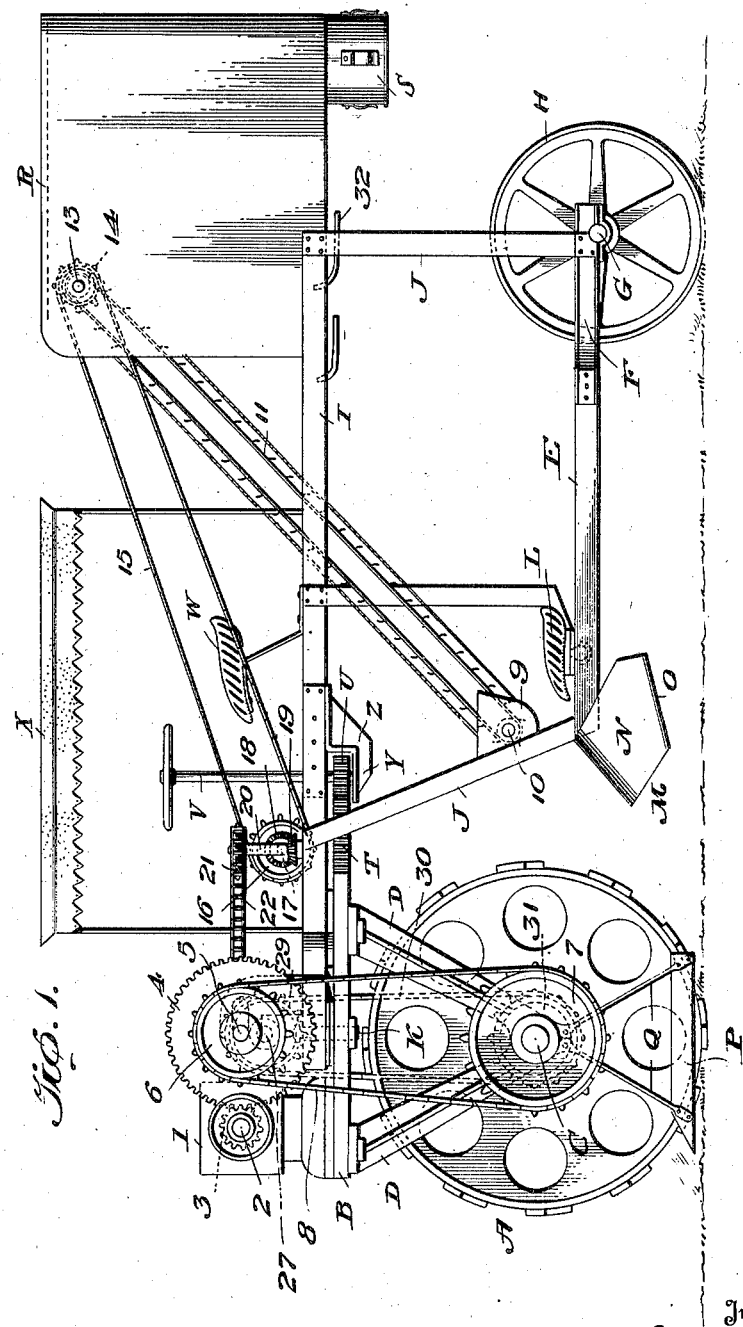

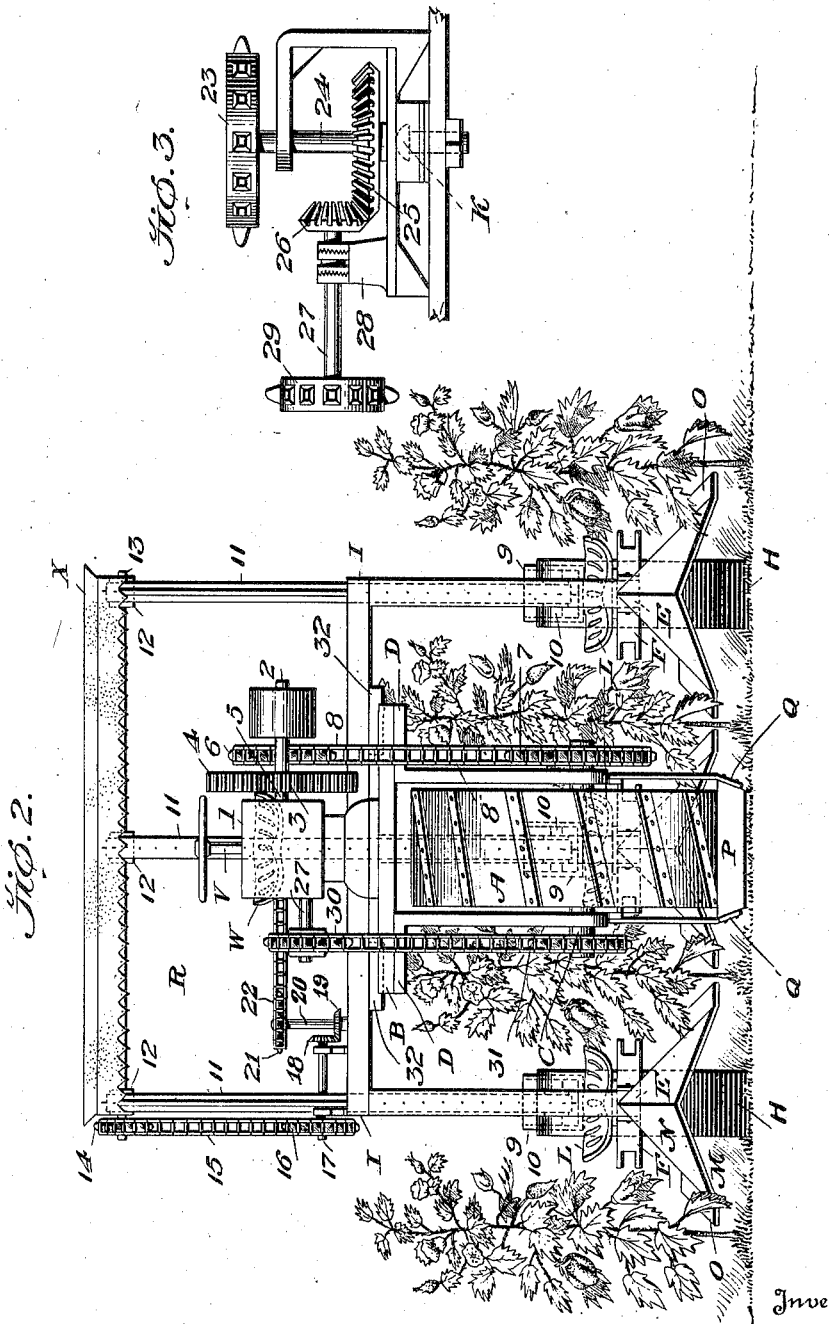

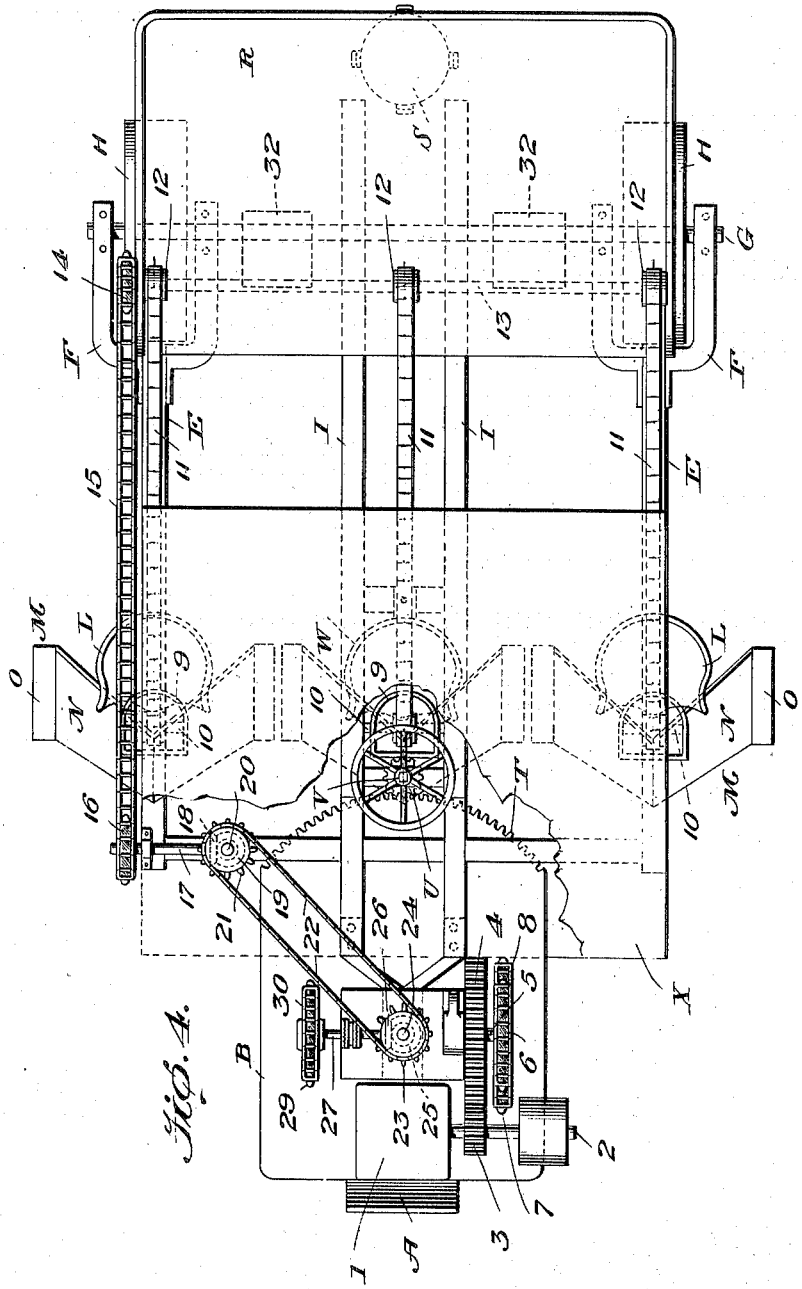

ALVIN E. STARK AND MYERS A. GARRETT, OF BRAZORIA, TEXAS; SAID MYERS A. GARRETT ASSIGNOR TO CARLTON M. GARRETT, OF DETROIT, MICHIGAN.

COTTON-HARVESTER.

1,275,781.  Specification of Letters Patent.  Patented Aug. 13, 1918.

Application filed February 18, 1918. Serial No. 217,899.

*To all whom it may concern:*

Be it known that we, ALVIN E. STARK and MYERS A. GARRETT, citizens of the United States, residing at Brazoria, in the county of Brazoria and State of Texas, have invented certain new and useful Improvements in Cotton-Harvesters, of which the following is a specification.

The picking of cotton is attended with such conditions that an efficient machine for the purpose has so far not been devised.

In the upland fields the bush grows from two to four feet high, the most common height being under three feet. The branches spread and the cotton bolls are distributed about the outer ends of the limbs. The plants are set in rows from two to seven feet apart, according to the quality of the soil, and usually are thinned out in the rows so that the plants are from two to four feet apart.

The bolls on the lower branches usually mature first and burst at maturity, exposing the snowy fiber. In gathering the lint it is needful to keep it free from leaves, stems, or fragments of the shell of the pods, all of which goes by the name of "trash," and when present impairs the value of the fiber.

The serious obstacles to mechanical picking arise from the irregular height and spacing of the plants, the inequality in the maturing of the bolls, the necessity of avoiding injury to the plants in the earlier gatherings, and the difficulty of withdrawing the ripe lint without admixture with husks, stems, and broken leaves. The problem is so complicated that a successful machine for picking has not yet been devised and seems impossible.

The object of our invention is to provide in connection with hand picking certain mechanism and devices whereby in such picking the usual disagreeable, exhausting and expensive labor may for the most part be eliminated, such as the bending of the body forwardly, stooping, dragging of a heavy bag about the furrow in the hot sun, and fumbling for the mouth of the bag with the hand.

To this end we provide a wheeled machine, preferably power operated, said machine having swiveled seats for the pickers, hopper elevators or conveyers or other devices located adjacent the seats in which the cotton picked by hand is to be deposited and delivered to a bin or other receptacle on the machine, means for elevating the lower branches of the plants to within easy reach of the pickers, and a protecting sun-shade, thereby in particular securing free movements of the hands and body and generally increasing the efficiency of the labor.

The machine constantly moving forwardly compels the picker to give undivided attention to the work and so prevents loafing or shirking. The speed of the machine is accommodated to the condition of the crop, moving faster or slower as may be necessary to gather the matured cotton. The hands of the picker being free at all times, he can avoid including in the picking leaves, twigs or other foreign matter, the product gathered consequently being a superior grade of cotton.

Our invention consists in certain novelties of construction and combinations and arrangements of parts as herein set forth and claimed. The accompanying drawings illustrate an example of the embodiment of our invention, the parts being combined and reciprocally arranged according to the best mode of procedure we have so far devised for the purpose.

Figure 1 is a side view in elevation of the entire machine or cotton harvester.

Fig. 2 is a front end view in elevation.

Fig. 3 shows in elevation part of the gearing which is located on the platform back of the motor.

Fig. 4 is a top plan view.

The main parts of the machine comprise a traction wheel A having a platform B supported upon the axle C through the medium of V-shaped supports, D D, carrying bearings mounted upon the journals, as shown; and a frame which may be of light channel beams riveted together, or of wood, embracing the lower parallel beams E, the two outer ones of which are provided with U-shaped extensions F which have bearings for the axles G of the supporting wheels H, the upper parallel beams I supported upon the upright beams J which are secured to the lower beams, the two central beams I being extended and united and pivoted to the platform B by means of any type of fifth wheel and a king bolt K.

Three swiveled seats L for the pickers are arranged in line and supported upon the lower parallel beams E, as shown. Below and in front of the seats and attached to the beams are deflecting pilots M, each having two inclined sides N and wings O which as the machine moves forwardly pass beneath the lower branches of cotton plants and raise them up to within easy reach of the hands of the pickers. The traction wheel A is also provided with a similar deflecting pilot P supported by depending bars or rods Q in front of and surrounding the tread of the wheel, its function being for raising and deflecting the lower branches of the plants from the path of the wheel so that they will not be crushed or injured by the forward movement of the same.

Upon the rear ends of the upper beams I is supported a closed bin or receptacle R within which the picked cotton is deposited, a chute S being provided for the discharge of the cotton from the bin or receptacle to bags.

The rear end of the platform B has a rack T of the shape of an arc of a circle which engages a toothed wheel U on a steering shaft V having a hand wheel located and suitably supported in front of a seat W occupied by the operator of the machine. It is obvious that the platform and traction wheel A can be turned toward the right or left by the rotation of the steering shaft and wheel U.

A sun-shade or canopy X suitably supported is provided above the four seats carried by the frame, which shade may be of any suitable dimensions.

It will be observed that the machine is supported upon two rear wheels H spaced apart and a single front traction wheel A, and that the latter wheel and the platform with the devices mounted upon it move together about the king bolt K as a center, the platform being held in place relative to the frame by the king bolt and the forwardly projecting arm Y of the bracket Z, which arm extends beneath the rack edge of the platform, thus preventing any wabbling or tipping of the platform relative to the ends of the frame to which it is pivoted.

The machine may be pushed or pulled or moved forwardly by any suitable power, animal or otherwise. We have shown a hydrocarbon or gas engine 1 mounted upon the platform B, the crank shaft 2 having a gear wheel 3 in mesh with a larger gear wheel 4 on a shaft 5, said shaft also carrying a sprocket wheel 6 which transmits rotary motion to the sprocket wheel 7 mounted on the traction wheel axle C by means of a sprocket chain 8. When used, the engine is controlled by the operator from the seat W through well known types of levers, clutches, etc., which form no part of our invention. The kind of motive power employed is immaterial, provided means are present for controlling the speed of the machine.

It will be seen from the drawings that the machine or harvester occupies three furrows when in use, each of the three seats being located between two rows of cotton plants so that each picker can gather or pick the cotton from one side of each two rows of plants at the left and at the right as the machine moves along. Each of the two outside pickers obviously gathers the cotton from one side only of an outer row, which rows are outside the machine. While the number of seats for pickers shown is three, more may be provided and disposed as desired.

Each picker is seated upon a swiveled seat which accommodates itself to the various movements of the picker, thus avoiding distortions of the body and arms, which latter are both free for use. As the cotton is gathered it is immediately deposited in the elevator or conveyer hoppers 9 secured upon the uprights in front of the pickers. Journaled within each hopper is a rotary shaft 10 around which passes an endless elevator belt or conveyer 11 provided with devices, such as plates or the like, which seize the cotton and convey it to and drop it in the bin or receptacle R at the top of the machine. The three endless elevator belts or conveyers are moved by pulley bearings 12 upon a rotary shaft 13 journaled in bearings supported by the bin frame, as shown. As disclosed by Fig. 1, each pulley bearing 12 on the shaft 13 is located inside the bin R, and an inclosing casing for each endless belt (shown in section, Fig. 1) extends from the bin R to a hopper 9, the upper end of each casing being open to the bin and the lower end being open to a hopper 9 only. Obviously, the wind or gravity cannot remove the picked cotton while being transferred by the belt and on its way to the bin. On the end of shaft 13 is a sprocket wheel 14 which is engaged by a sprocket chain 15 which receives motion from a sprocket wheel 16 on a shaft 17 journaled in the frame and provided at the end with a beveled gear wheel 18 in mesh with a beveled gear wheel 19 on a vertical shaft 20 having at the top end a sprocket wheel 21. This latter sprocket wheel receives motion from a sprocket chain 22 engaging a sprocket wheel 23 on a vertical shaft 24 suitably mounted in bearings and carrying a beveled gear wheel 25 in mesh with a beveled gear wheel 26 on shaft 27 rotatable in a bearing 28 and on this shaft is a sprocket wheel 29. Power is transmitted to this sprocket wheel 29 by a sprocket chain 30 passed over a sprocket wheel 31 on the axle C of the traction wheel. A clutch of any type may be provided for throwing the sprocket wheel on the traction wheel axle out of gear, or the clutch may be located elsewhere.

It should be noted that the sprocket wheel 23, shaft 24, wheels 25, 26, shaft 27 and sprocket wheel 29 are supported by a frame (see Fig. 3) mounted on the platform B, the shaft 24 being vertical and in direct line with the king bolt K by which the end of the main frame is pivoted to the platform B. Obviously, the platform and traction wheel can be turned by the operator without interferring with the transmission of power through the sprocket chain 22.

After the bin or receptacle is filled with cotton it is quickly emptied by pushing the cotton through the circular opening in the bottom of the same and the chute into bags or other receptacles, thus keeping the cotton clean.

In the machine as illustrated we have provided curved plates 32 upon the rear end of the frame which deflect or bend the tops of the cotton plants downwardly when high and prevent the injury of the same and the tearing or scraping off of the blossoms or bolls by the sharp corners or edges of the frame.

From the foreging description and the illustrations of the embodiment of the invention it becomes clear that we have provided a mechanism and devices adapted for use in attaining the ends set forth as the object of our invention. Obviously modifications and additions may be made and unsubstantial changes and substitutions be introduced in the practical application of the principle without constituting departures which will fall outside the scope of the claims.

What we claim is:

1. The combination in a cotton harvester, of a frame mounted upon wheels spaced to move between rows of cotton plants, one of said wheels being a traction wheel, means for pivotally connecting the traction wheel to one end of the frame, means for turning said traction wheel about its pivotal center and relative to the frame, seats for pickers supported by said frame and located between the rows of plants, a bin or receptacle on the frame, a hopper supported adjacent each seat, an inclosing casing extending from each hopper to the bin one end of said casing being open into the bin and the other end open to the hopper, devices located within the hoppers, casings and bin for transferring the cotton picked by hand from the hoppers to the bin, gearing for operating said transferring devices, and means for transmitting motion from said pivoted traction wheel to said gearing.

2. The combination in a cotton harvester, of a frame mounted upon wheels spaced to move between rows of cotton plants, one of said wheels being a traction wheel, a platform supported by the traction wheel, means for pivotally connecting the platform to the end of the frame, means in connection with the platform and frame for turning said platform and traction wheel about the pivotal center for steering, seats for pickers supported by said frame and located between the rows of plants, a bin or receptacle on the frame, a hopper supported adjacent each seat, a hollow casing extending from each hopper to the bin one end of said casing being open into the bin and the other end open to the hopper, means for transferring the cotton picked by hand from the hoppers to the bin, gearing for operating said transferring means, and means for transmitting motion from the platform carried by the traction wheel to said gearing which operates the said cotton transferring means.

3. A cotton harvester having a frame supporting seats for pickers and mounted upon wheels, a bin, devices for transferring the cotton picked by hand to the bin, a traction wheel and platform to which the front end of the platform is pivoted, means for steering the wheel and platform, a motor on the platform for propelling the harvester, and transmission mechanism between the platform and the said transferring devices.

4. A cotton harvester comprising a frame mounted upon wheels spaced to move between rows of cotton plants, seats for pickers located between the rows, and pilots in front of the seats adapted to raise the lower branches of the plants to positions where the cotton on said branches can easily be reached by the hands of the pickers.

5. A cotton harvester comprising a frame mounted on wheels, the front wheel being a traction wheel, said wheels being spaced to move between rows of cotton plants and said traction wheel provided with a deflecting pilot for raising and deflecting the lower branches of the plants from the path of the wheel.

6. A cotton harvester comprising a frame mounted upon wheels spaced to move between rows of cotton plants, said frame being provided with deflecting plates or devices for bending over the tops of the taller plants so as to avoid detaching or injuring the blossoms and bolls upon said tops.

7. A cotton harvester having a frame mounted upon wheels one of which is a traction wheel having an axle, a platform secured to the traction wheel, means as a king bolt for pivoting one end of the frame to the platform, seats upon the frame for pickers, a receptacle for the picked cotton, devices for transferring the cotton from positions adjacent the seats to the receptacle, and means for transmitting power from the traction wheel axle to the said transferring devices.

8. A cotton harvester comprising a frame mounted upon wheels one of said wheels having secured thereto a platform movable with said wheel, means as a king bolt for pivoting said frame to said platform, power actuated devices upon the frame for transferring picked cotton to a receptacle carried by the frame, means for transmitting power from mechanism mounted on the platform to said devices for transferring the cotton, one element of said means being located upon the platform and substantially coinciding with the axis of the king bolt whereby said platform and wheel may be turned through the arc of a circle without interfering with the transmission means.

9. The combination in a cotton harvester, of a frame mounted upon wheels spaced to move between rows of cotton plants, one of said wheels being a traction wheel, a platform supported by the traction wheel, means for pivotally connecting the platform to the end of the frame, means for steering the traction wheel and platform, seats for pickers supported by the frame, a bin carried by the frame, hoppers one located adjacent each seat, a hollow casing connecting each hopper with the interior of the bin, means for transferring the cotton picked by hand from the hoppers to the bin, gearing for operating the said transferring means, a motor on the said platform, means for transmitting motion from the motor to the traction wheel, and means for transmitting motion from the pivoted traction wheel and platform to the said gearing for operating the said cotton transferring means.

In testimony whereof we affix our signatures.

ALVIN E. STARK.
MYERS A. GARRETT.